United States Patent [19]

Fujiki et al.

[11] Patent Number: 4,721,764
[45] Date of Patent: Jan. 26, 1988

[54] CURABLE ORGANOPOLYSILOXANE COMPOSITION

[75] Inventors: Hironao Fujiki, Takasaki; Hiroyuki Tanaka, Annaka, both of Japan

[73] Assignee: Shin Etsu Chemical Co., Ltd., Tokyo, Japan

[21] Appl. No.: 30,713

[22] Filed: Mar. 25, 1987

[30] Foreign Application Priority Data

Apr. 2, 1986 [JP] Japan .................................. 61-76397

[51] Int. Cl.$^4$ .......................................... C08G 77/06
[52] U.S. Cl. ...................................... 528/15; 528/31; 528/32; 525/478; 525/479
[58] Field of Search ............................ 528/15, 31, 32; 525/478, 479

[56] References Cited

U.S. PATENT DOCUMENTS 4,163,081 7/1979 Schulz .................................... 528/15
4,311,739 1/1982 Hardman et al. ...................... 525/15

*Primary Examiner*—Melvyn I. Marquis
*Attorney, Agent, or Firm*—Hopgood, Calimafde, Kalil, Blaustein & Judlowe

[57] ABSTRACT

The curable organopolysiloxane composition is curable by heating at a relatively low temperature of, for example, 120° C. into a silicone rubber which exhibits outstandingly high adhesive bonding strength to the substrate surface on which it has been cured. The composition is formulated with (A) a trivinylsilyl-terminated diorganopolysiloxane, (B) an organohydrogenpolysiloxane as the crosslinking agent, (C) a preferably cyclic organopolysiloxane having two silicon-bonded hydrogen atoms and at least one hydrolyzable group, e.g. methoxy, or oxirane-containing group, e.g. glycidyl, in a molecule and (D) a platinum compound as a catalyst to promote the hydrosilation reaction between the vinyl groups in (A) and the silicon-bonded hydrogen atoms in (B).

7 Claims, No Drawings

CURABLE ORGANOPOLYSILOXANE COMPOSITION

BACKGROUND OF THE INVENTION

The present invention relates to a curable organopolysiloxane composition or, more particularly, to an organopolysiloxane composition which is curable by heating at a relatively low temperature to give a cured silicone rubber and capable of exhibiting strong adhesion to the surface of a substrate of various materials, e.g. metals and plastics, on which the composition has been cured, even without using any primer.

There is a well-known class of organopolysiloxane compositions curable by the mechanism of so-called hydrosilation to form crosslinks. Such a curable organopolysiloxane composition comprises, as the essential ingredients thereof, an organopolysiloxane having alkenyl, e.g. vinyl, groups bonded to the silicon atoms, an organohydrogenpolysiloxane having hydrogen atoms directly bonded to the silicon atoms and a catalytic amount of a platinum compound. When the composition is heated, an addition reaction called the hydrosilation reaction takes place between the alkenyl groups in the organopolysiloxane and the silicon-bonded hydrogen atoms in the organohydrogenpolysiloxane in the presence of the platinum catalyst to form crosslinks. The curable organopolysiloxane compositions of this type are useful as a material for sealing, caulking, potting and coating in a variety of applications, for example, in electric and electronic industries.

One of the problems in the curable organopolysiloxane compositions of this type is the relatively poor adhesion of the cured composition to the surface of the substrate made of, in particular, a metal on which the composition has been cured. This detrimental property of the composition sometimes causes serious drawbacks when the composition is used for potting of electric circuit boards, coating of electric components, impregnation of motor coils, flyback transformers of television sets, etc., junction coating of semiconductor devices and the like due to peeling or separation of the cured composition from the substrate surface to allow intrusion of water or moisture resulting in fatal damage to the electric performance.

As a remedy for the above described problems in the curable organopolysiloxane compositions of this type, proposals have been made in Japanese Patent Publication Nos. 53-13508, 58-26376 and 59-5219 to introduce hydrolyzable groups to the vinyl-containing organopolysiloxane. This measure is indeed effective to some extent to improve the adhesion characteristics of the organopolysiloxane compositions curable by the mechanism of hydrosilation but the effect obtained by this means so far is still quite unsatisfactory in comparison with other curable polymers such as epoxy-based resins in respect of the adhesion to metals and plastics so that no fundamental solution of the problem has yet been obtained.

SUMMARY OF THE INVENTION

Thus, the present invention, which has been completed as a result of the extensive investigations undertaken with an object to solve the above described problems, provides a curable organopolysiloxane composition which comprises:

(A) 100 parts by weight of an organopolysiloxane represented by the average unit formula $$R^1{}_a R^2{}_b SiO_{(4-a-b)/2}, \qquad (I)$$

in which $R^1$ is a monovalent organic group having at least one ethylenically unsaturated linkage, $R^2$ is a monovalent hydrocarbon group free from aliphatic unsaturation, the subscript a is a positive number in the range from 0.0001 to 0.3 and the subscript b is a positive number which is larger than 1.8 but smaller than 2.5 with the proviso that $a+b$ is in the range from 1.8 to 2.5, each of the silicon atoms at the molecular chain ends having at least one group denoted by $R^1$ bonded thereto, and the overall number of the ethylenically unsaturated linkages in the group or groups denoted by $R^1$ bonded to each of the silicon atoms at the molecular chain ends being at least two;

(B) an organohydrogenpolysiloxane represented by the average unit formula $$R^2{}_c H_d SiO_{(4-c-d)/2}, \qquad (II)$$

in which $R^2$ has the same meaning as defined above, the subscript c is a positive number in the range from 0.5 to 2.5 and the subscript d is a positive number in the range from 0.015 to 2.0 with the proviso that $c+d$ is in the range from 1.5 to 2.5, having at least three hydrogen atoms directly bonded to the silicon atoms in a molecule in such an amount as to be sufficient to provide from 0.4 to 4.0 moles of the hydrogen atoms directly bonded to the silicon atoms per mole of the ethylenically unsaturated linkages in the groups denoted by $R^1$ in the component (A);

(C) from 1 to 15 parts by weight of an organopolysiloxane compound having, in a molecule, two hydrogen atoms directly bonded to the silicon atoms and at least one functional group selected from the class consisting of hydrolyzable groups bonded directly to the silicon atom or atoms and oxirane groups bonded to the silicon atoms either directly or through a carbon atom or carbon atoms; and (D) a platinum compound in an amount of 1 to 100 ppm by weight as platinum based on the component (A).

DETAILED DESCRIPTION OF THE PREFERRED EMBODIMENTS

As is understood from the above given summary of the invention, the base ingredient in the inventive composition is the component (A) which is an organopolysiloxane represented by the average unit formula (I). In the formula, the symbol $R^1$ denotes a monovalent organic group having at least one ethylenically unsaturated linkage including alkenyl groups, e.g. vinyl, allyl, butenyl and hexenyl groups, and alkenyl-containing groups, e.g. vinyloxy and allyloxy groups as well as (meth)acryloxy-substituted alkyl groups, e.g. 3-(meth)acryloxypropyl group. Alkyl groups substituted with one or more of such alkenyl and/or alkenyloxy groups are also suitable as $R^1$. The symbol $R^2$ denotes a monovalent hydrocarbon group free from aliphatic unsaturation exemplified by alkyl groups, e.g. methyl, ethyl, propyl and butyl groups, cycloalkyl groups, e.g. cyclohexyl group, aryl groups, e.g. phenyl and tolyl groups, and aralkyl groups, e.g. 2-phenylethyl and 2-phenylpropyl groups, as well as substituted hydrocarbon groups obtained by replacing a part or all of the hydrogen atoms in the above named hydrocarbon groups with substituent atoms and/or groups such as halogen atoms, cyano groups and the like, e.g. chloromethyl, 3,3,3-trifluoropropyl and 2-cyanoethyl groups. The groups denoted by $R^2$ in the component (A) should preferably be all or mostly methyl groups from the standpoint of easiness in the synthetic preparation of the compound and the generally superior properties of the composition after curing although improvements in some respects can be obtained by the introduction of substituents such as the improvement in the solvent resistance of the cured composition by the introduction of the 3,3,3-trifluoropropyl groups.

The subscripts a and b in the formula (I) are each a positive number in the ranges from 0.0001 to 0.3 and from 1.8 to 2.5, respectively, with the proviso that a+b is from 1.8 to 2.5.

In the organopolysiloxane as the component (A), each of the silicon atoms at the molecular chain ends should have at least one unsaturated group denoted by $R^1$ bonded thereto and the number of the unsaturated linkages in the group or groups denoted by $R^1$ bonded to each terminal silicon atom should be at least two or, preferably, at least three in order that the composition as cured may exhibit strong adhesion to the substrate surface on which it has been cured.

The organopolysiloxane as the component (A) should preferably be a diorganopolysiloxane having a substantially linear molecular structure although small amounts of branches in the molecular structure have no particularly adverse influences. The organopolysiloxane should have a viscosity in the range from 50 to 500,000 centipoise at 25° C. since an organopolysiloxane of which the viscosity is too low would not give a cured composition having sufficiently high mechanical strengths while a composition formulated with an organopolysiloxane of which the viscosity is too high would have a problem in the workability.

The terminal silyl groups at the molecular chain ends of the organopolysiloxane as the component (A), of which at least two ethylenically unsaturated linkages should be contained in the group or groups denoted by $R^1$ bonded to each terminal silicon atom, are exemplified by divinylmethyl silyl group, trivinyl silyl group, triallyl silyl group and 3-[(1,2,2-triallyloxyethyl)oxy]-propyl dimethyl silyl group. Divinylmethyl silyl and trivinyl silyl groups are preferred. Several of the examples of the organopolysiloxane as the component (A) having such terminal silyl groups are expressed by the following structural formulas, in which the symbols Me and Vi denote methyl and vinyl groups, respectively:

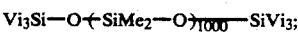

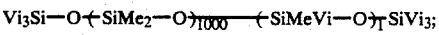

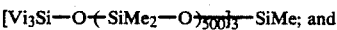

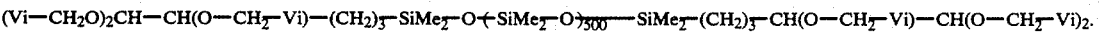

The component (B) in the inventive organopolysiloxane composition is an organohydrogenpolysiloxane represented by the average unit formula (II) given above, in which $R^2$, c and d each have the meaning defined before although the groups denoted by $R^2$ should preferably be all or mostly methyl groups in view of the easiness in the synthetic preparation. Since the component (B) should serve as a crosslinking agent of the component (A), the organohydrogenpolysiloxane should have at least three hydrogen atoms directly bonded to the silicon atoms in a molecule. A typical and preferable example of the organohydrogenpolysiloxane is a polysiloxane having a linear molecular structure expressed by the structural formula

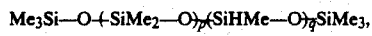

in which p is zero or a positive integer not exceeding 100 and q is a positive integer of from 3 to 100. It is more preferable, however, that the organohydrogenpolysiloxane has a branched molecular structure composed of the monofunctional siloxane units of the formula $Me_2HSiO_{0.5}$ and tetrafunctional siloxane units of the formula $SiO_2$ in a molar ratio of 1:1 to 3:1.

The amount of the component (B) in the inventive composition should be in such a range that from 0.4 to 4.0 moles or, preferably, from 0.9 to 3.0 moles of the hydrogen atoms directly bonded to the silicon atoms in the component (B) are provided per mole of the ethylenically unsaturated linkages in the component (A) in consideration of the role played by the component (B) that the addition reaction of so-called hydrosilation takes place between the ethylenically unsaturated linkages in the component (A) and the silicon-bonded hydrogen atoms in the component (B) to form crosslinks.

The component (C) in the inventive organopolysiloxane composition is a specific organopolysiloxane which serves to improve the adhesion characteristics of the composition. The organopolysiloxane should have, in a molecule, two and only two hydrogen atoms directly bonded to the silicon atoms and at least one functional group selected from the class consisting of hydrolyzable groups which should be directly bonded to the silicon atoms, and an oxirane-containing group, which may be bonded to the silicon atom either directly or through a carbon atom or atoms. The hydrolyzable groups bonded to the silicon atoms are exemplified by methoxy, ethoxy, isopropenyloxy, 2-methoxyethoxy and 2-ethoxyethoxy groups. The oxirane-containing groups are exemplified by epoxy and 2-(3,4-epoxycyclohexyl)ethyl groups. The epoxy group should be in the form of a glycidyl group or, in particular, 3-(glycidyloxy)propyl group.

The organopolysiloxane as the component (C) may have a linear molecular structure as expressed by the formulas:

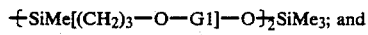

in which Gl is a glycidyl group and g is zero or a positive integer. In respect of the miscibility with the component (A), it is preferable that the degree of polymerization of such a linear organopolysiloxane should not be excessively large. In this regard, preferable organopolysiloxanes as the component (C) should have a cyclic structure or, in particular, a structure of a cyclotetrasiloxane. Exemplary of such a cyclic organopolysiloxane in conformity with the definition of the component (C) are the compounds expressed by the following structural formulas, in which the symbols Me, Et, Gl, Ep and Ech denote methyl, ethyl, glycidyl, epoxy and 3,4-epoxycyclohexyl groups, respectively:

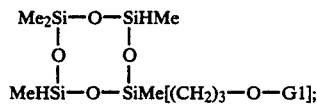

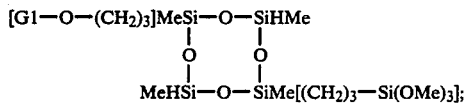

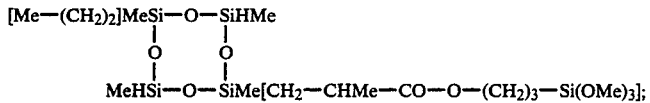

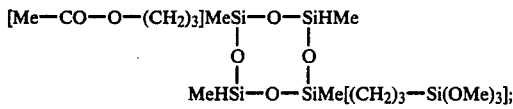

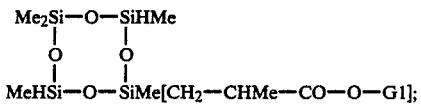

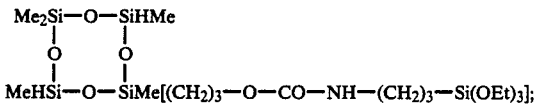

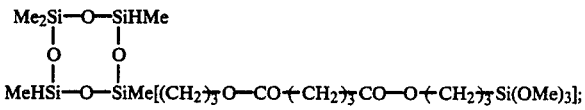

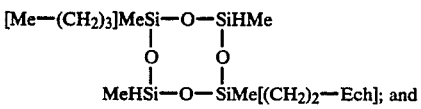

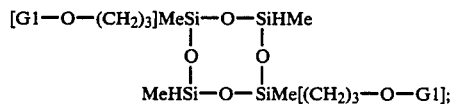

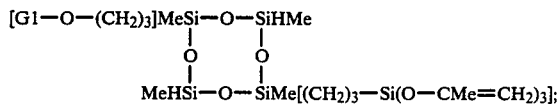

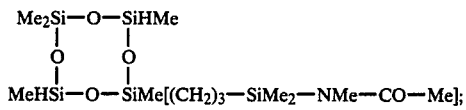

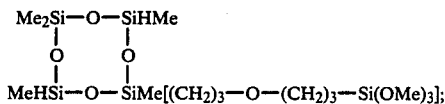

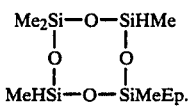

such a proportion that the amount of the 1-ethynyl cyclohexanol is 5 moles per mole of platinum and the mixture is agitated for 24 hours at 25° C. to form dark brown precipitates followed by removal of toluene and unreacted vinyl siloxane and 1-ethynyl cyclohexanol at 25° C. under reduced pressure to leave a solid product, The component (D) is a platinum compound which serves as a catalyst to promote the addition reaction of hydrosilation between the ethylenically unsaturated groups in the component (A) and the silicon-bonded hydrogen atoms in the components (B) and (C). Various kinds of platinum compounds and platinum-containing materials are known as the catalyst for the reaction of hydrosilation and any of them can be used as the component (D) including those homogeneously miscible with the organopolysiloxanes such as chloroplatinic acid modified or unmodified with an alcohol, complexes of chloroplatinic acid with an olefin or a vinylsiloxane, complexes of platinum and an acetylenic compound formed between zero-valency platinum and an acetylene alcohol, such as 3-methyl-1-butyn-3-ol, 3-methyl-1-pentyn-3-ol, 3,5-dimethyl-1-hexyn-3-ol and 1-ethynyl cyclohexanol, and the like. The last mentioned complexes of platinum and an acetylenic compound can be prepared, for example, in the following manner. Thus, a platinum-vinyl siloxane complex obtained by the reaction of hexachloroplatinic acid and 1,1,3,3-tetramethyl-1,3-divinyl disiloxane is admixed with a toluene solution of 1-ethynyl cyclohexanol in which is dissolved in 2-ethylhexyl alcohol to give a solution in a concentration of, for example, 2% by weight as platinum which can be used as the platinum catalyst in the inventive composition. Solid platinum catalysts in a fine powdery form can also be used such as platinum black, carrier-supported catalysts on silica, alumina, silica-alumina and the like. These solid platinum catalysts should be as finely divided as possible or the carrier should have a particle size as small as possible with a specific surface area as large as possible in order to ensure good dispersibility of the catalyst in the organopolysiloxanes and high effectiveness as a catalyst. In this regard, the above mentioned platinum compound miscible with or soluble in the organopolysiloxanes are preferred. The amount of the component (D) in the inventive composition should be a so-called catalytic amount which is not particularly limitative depending on the desired velocity of curing and economy in consideration of the expensiveness of the platinum compound. When the catalyst is a compound soluble in the organopolysiloxanes, for example, the amount should be in the range from 1 to 50 ppm by weight as platinum based on the amount of the component (A). When a solid catalyst insoluble in the organopolysiloxanes is used such as platinum black, the amount should be larger and, for example, in the range from 20 to 100 ppm by weight as platinum.

The curable organopolysiloxane composition of the invention can be prepared by uniformly blending the above described components (A) to (D) in the above specified proportion. It is of course optional that the inventive composition is admixed according to need with various kinds of known additives. For example, an amine compound, titanium-based compound or aluminum compound is added to promote the hydrolysis reaction of the hydrolyzable group in the component (C). The silicone rubber obtained by curing the composition may be imparted with improved mechanical strengths when the composition is admixed, according to the disclosure in Japanese Patent Publications Nos. 38-26771 and 45-9476, with a resinous organopolysiloxane composed of the monofunctional siloxane units of the formulas $(CH_2=CH)R_2SiO_{0.5}$ and $R_3SiO_{0.5}$, R being a monovalent hydrocarbon group free from aliphatic unsaturation, and tetrafunctional siloxane units of the formula $SiO_2$. The curing velocity of the composition can be controlled by admixing the composition with an organopolysiloxane having a difunctional unit of the formula $(CH_2=CH)RSiO$ (Japanese Patent Publication No. 48-10947), acetylenic compound (U.S. Pat. No. 3,445,420) or ionic heavy metal compound (U.S. Pat. No. 3,532,649). Addition of a non-functional organopolysiloxane has an effect to improve the resistance against thermal shock and flexibility of the silicone rubber obtained by curing the composition. Further, addition of a filler to the inventive composition has effects of decreasing shrinkage of the composition by curing, decreasing the thermal expansion coefficient of the cured rubber, improving the heat stability, weatherability, resistance against chemicals, flame retardancy and mechanical strengths of the cured rubber and decreasing the gas permeability of the cured rubber and so on. Suitable fillers include siliceous fillers such as finely divided fumed silica, precipitated silica, diatomaceous earth and powders of quartz and fused quartz glass, calcium carbonate, aluminum oxide, iron oxide, zinc oxide, titanium dioxide, magnesium carbonate, carbon black, ceric oxide, ceric hydroxide and the like.

The crosslinking reaction in the inventive organopolysiloxane composition proceeds between the organopolysiloxane as the component (A) and the organohydrogenpolysiloxane as the component (B) in the presence of the platinum catalyst as the component (D) even at room temperature to give a cured silicone rubber, which is firmly bonded by adhesion to the substrate surface on which it has been cured. It is preferable, however, that the curing of the composition is performed by heating the composition at a temperature of 100° C. or higher or, more preferably, 120° C. or higher in order to obtain further increased adhesive bonding of the cured composition to the substrate surface. Increase in the amount of the platinum compound as the component (D) in the inventive composition is effective not only in respect of the increased curing velocity but also in respect of the increase in the adhesive bonding strength. A preferable way to obtain improved adhesive bonding of the composition is to perform curing in two steps, in which the composition is first cured by keeping or heating at a temperature in the range from room temperature to 100° C. and then heating the thus preliminarily cured composition at a temperature of 120° to 150° C. Very firm adhesive bonding of the cured composition to the substrate surface can be obtained almost irrespective of the material of the substrate which may be a metal, glass, ceramic, stone, concrete, wood, paper, fabric, plastic, rubber or the like. Accordingly, the inventive curable organopolysiloxane composition is useful as an adhesive, sealing agent, potting agent, coating agent, impregnating agent and the like in which firm and durable adhesive bonding is essential between the cured silicon rubber and the substrate surface.

In the following, the curable organopolysiloxane composition of the invention is described in more detail by way of examples, in which the term "parts" always refers to "parts by weight" and the values of viscosity are all those obtained by the measurement at 25° C. The symbols Me, Vi and Gl appearing in the formulas hereinbelow denote methyl, vinyl and glycidyl groups, respectively.

EXAMPLES 1 TO 3 AND COMPARATIVE EXAMPLES 1 TO 3

Six curable organopolysiloxane compositions were prepared each by uniformly blending: 100 parts of a trivinylsilylterminated dimethylpolysiloxane having a viscosity of 5000 centipoise and expressed by the structural formula

$Vi_3Si-O+SiMe_2-O)_{450}SiVi_3$, 2 parts of a trimethylsilylterminated dimethyl methylhydrogen polysiloxane having a viscosity of 20 centipoise and containing 0.7% by weight of the silicon-bonded hydrogen atoms as expressed by the average formula

$Me_3Si-O+SiMe_2-O)_{10.5}(SiMe-O)_{9.5}SiMe_3$, 0.01 part of an octyl alcohol solution of chloroplatinic acid containing 2% by weight of platinum and 2 parts (Examples 1 to 3) or 1.5 parts (Comparative Examples 1 to 3) of an organopolysiloxane which was one of the compounds C-1 to C-6 specified below in Examples 1 to 3 and Comparative Examples 1 to 3, respectively.

Organopolysiloxane C-1:

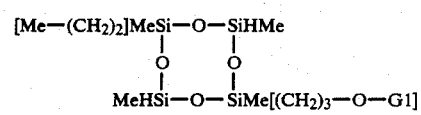

Organopolysiloxane C-2:

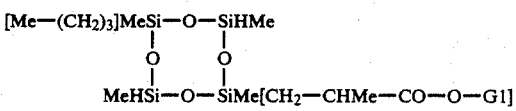

Organopolysiloxane C-3:

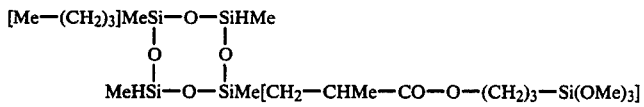

Organopolysiloxane C-4:

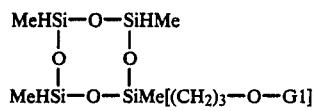

Organopolysiloxane C-5:

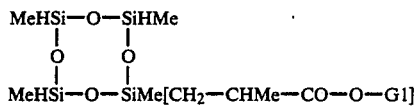

Organopolysiloxane C-6:

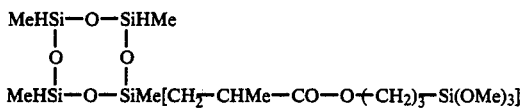

Each of these six compositions was spread in a thickness of 2 mm on test panels of aluminum and polyethylene terephthalate (PET) and heating at 130° C. for 30 minutes to be cured into a layer of cured silicone rubber. The silicone rubber layer was peeled by manually pulling to evaluate the adhesive bonding strength to the substrate surface. The results were that the adhesive bonding of the compositions in Examples 1 to 3 was extremely strong to the surface of the aluminum panels and quite strong to the surface of the PET panels while the adhesive bonding of the compositions in Comparative Examples 1 to 3 was strong to the surface of the aluminum panels but relatively poor to the surface of the PET panels not to withstand forcible peeling.

EXAMPLES 4 TO 11

Eight curable organopolysiloxane compositions were prepared each by uniformly blending 100 parts of the same trivinylsilyl-terminated dimethylpolysiloxane as used in the preceding examples, 2 parts of a dimethylsilyl-terminated dimethyl methylhydrogen polysiloxane having a viscosity of 20 centipoise and containing 0.7% by weight of the silicon-bonded hydrogen atoms as expressed by the average formula

0.01 part of an octyl alcohol solution of chloroplatinic acid containing 2% by weight of platinum and 2 parts of an organopolysiloxane which was one of the compounds C-7 to C-14 specified below in Examples 4 to 11, respectively.

Organopolysiloxane C-7:

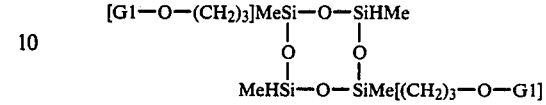

Organopolysiloxane C-8:

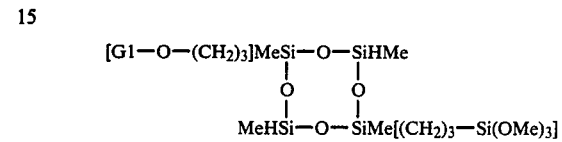

Organopolysiloxane C-9:

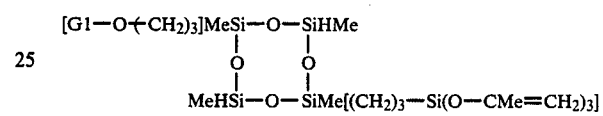

Organopolysiloxane C-10:

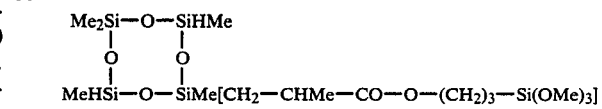

Organopolysiloxane C-11:

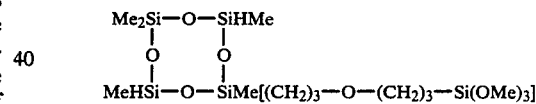

Organopolysiloxane C-12:

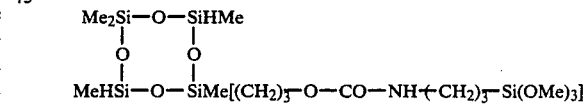

Organopolysiloxane C-13:

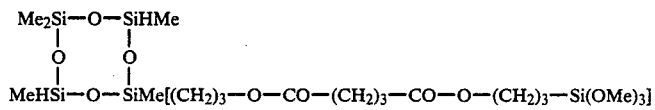

Organopolysiloxane C-14:

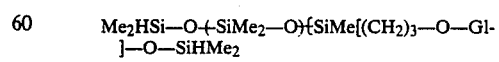

Each of these eight compositions was subjected to the test for curing and adhesive bonding strength in the same manner as in the preceding examples. The results were that the adhesive bonding of the cured silicone rubber was excellently strong to the surface of the aluminum panel in each of Examples 4 to 11 while the adhesive bonding to the PET panels was excellently strong in Examples 4, 5, 6 and 9, acceptably strong in Examples 7, 8 and 10 but somewhat poor in Example 11.

EXAMPLES 12 TO 16 AND COMPARATIVE EXAMPLES 4 TO 7

Nine curable organopolysiloxane compositions were prepared each by uniformly blending 100 parts of a diorganopolysiloxane which was the trivinylsilyl-terminated organopolysiloxane A-2 having a viscosity of 100,000 centipoise (Examples 12 and 13), trivinylsilyl-terminated organopolysiloxane A-3 having a viscosity of 100,000 centipoise (Examples 14 and 15), divinylmethylsilyl-terminated organopolysiloxane A-4 having a viscosity of 100,000 centipoise (Example 16), dimethylvinylsilyl-terminated organopolysiloxane A-5 having a viscosity of 100,000 centipoise (Comparative Examples 4 and 5) or dimethylvinylsilyl-terminated organopolysiloxane A-6 having a viscosity of 100,000 centipoise (Comparative Examples 6 and 7) expressed by the formulas given below, 2 parts of a resinous methylhydrogenpolysiloxane composed of the monofunctional siloxane units of the formula $Me_2HSiO_{0.5}$ and tetrafunctional siloxane units of the formula $SiO_2$ in a molar ratio of 1.5:1 corresponding to a content of 1.0% by weight of the silicon-bonded hydrogen atoms, 2 parts of the organopolysiloxane C-1 used in Example 1 (Examples 12 and 14 and Comparative Examples 4 and 6) or the organopolysiloxane C-7 used in Example 4 (Examples 13, 15 and 16 and Comparative Examples 5 and 7), 0.01 part of an octyl alcohol solution of chloroplatinic acid containing 2% by weight of platinum, 20 parts of another resinous organopolysiloxane composed of 42.5% by moles of the monofunctional siloxane units of the formula $Me_3SiO_{0.5}$, 7.5% by moles of the monofunctional siloxane units of the formula $ViMe_2SiO_{0.5}$ and 50% by moles of the tetrafunctional siloxane units of the formula $SiO_2$ and 30 parts of a finely divided silica filler.

Organopolysiloxane A-2:

Organopolysiloxane A-3:

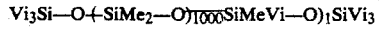

Organopolysiloxane A-4:

Organopolysiloxane A-5:

Organopolysiloxane A-6:

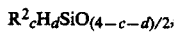

Each of the thus prepared nine compositions was spread on a test panel of a PET resin in a thickness of 2 mm and heated at 120° C. for 30 minutes to be cured into a cured silicone rubber. The thus obtained cured silicone rubber sheet was subjected to the measurement of the shearing adhesive bonding strength along with the percentage of cohesive failure along with measurements of the mechanical properties of separately prepared cured rubber sheets including hardness, ultimate elongation and tensile strength to give the results shown in the table given below.

| | | Example | | | | | Comparative Example | | | |
|---|---|---|---|---|---|---|---|---|---|---|
| | | 12 | 13 | 14 | 15 | 16 | 4 | 5 | 6 | 7 |
| Shearing adhesive bonding, kg/cm² (cohesive failure, %) | | 20.0 (100) 19.8 (100) | 27.5 (100) 28.0 (100) | 21.1 (100) 20.0 (100) | 24.3 (100) 25.0 (100) | 22.5 (100) 21.3 (100) | 8.5 (70) 7.0 (85) | 11.5 (95) 13.6 (80) | 11.8 (90) 11.6 (80) | 16.5 (90) 19.0 (90) |
| Mechanical properties | Hardness, JIS A | 43 | 45 | 43 | 45 | 40 | 42 | 44 | 36 | 38 |
| | Ultimate elongation, % | 370 | 400 | 280 | 300 | 340 | 320 | 350 | 280 | 305 |
| | Tensile strength, kg/cm² | 42 | 48 | 50 | 51 | 42 | 50 | 55 | 34 | 35 |

What is claimed is:

1. A curable organopolysiloxane composition which comprises:

(A) 100 parts by weight of an organopolysiloxane represented by the average unit formula $$R^1_a R^2_b SiO_{(4-a-b)/2},$$

in which $R^1$ is a monovalent organic group having at least one ethylenically unsaturated linkage, $R^2$ is a monovalent hydrocarbon group free from aliphatic unsaturation, the subscript a is a positive number in the range from 0.0001 to 0.3 and the subscript b is a positive number larger than 1.8 but smaller than 2.5 with the proviso that a+b is in the range from 1.8 to 2.5, each of the silicon atoms at the molecular chain ends having at least one group denoted by $R^1$ bonded thereto, and the overall number of the ethylenically unsaturated linkages in the group or groups denoted by $R^1$ bonded to each of the silicon atoms at the molecular chain ends being at least two;

(B) an organohydrogenpolysiloxane represented by the average unit formula $$R^2_c H_d SiO_{(4-c-d)/2},$$

in which $R^2$ has the same meaning as defined above, the subscript c is a positive number in the range from 0.5 to 2.5 and the subscript d is a positive number in the range from 0.015 to 2.0 with the proviso that c+d is in the range from 1.5 to 2.5, having at least three hydrogen atoms directly bonded to the silicon atoms in a molecule in such an amount as to be sufficient to provide from 0.4 to 4.0 moles of the hydrogen atoms directly bonded to the silicon atoms per mole of the ethylenically unsaturated linkages in the groups denoted by $R^1$ in the component (A);

(C) from 1 to 15 parts by weight of an organopolysiloxane compound having, in a molecule, two hydrogen atoms directly bonded to the silicon atoms and at least one functional group selected from the class consisting of hydrolyzable groups bonded directly to the silicon atom or atoms and oxirane groups bonded to the silicon atoms either directly or through a carbon atom or carbon atoms; and (D) a platinum compound in an amount of 1 to 100 ppm by weight as platinum based on the component (A).

2. The curable organopolysiloxane composition as claimed in claim 1 wherein the group denoted by $R^1$ is a vinyl group.

3. The curable organopolysiloxane composition as claimed in claim 1 wherein each of the silicon atoms at the molecular chain ends of the organopolysiloxane as the component (A) has three vinyl groups bonded thereto.

4. The curable organopolysiloxane composition as claimed in claim 1 wherein the group denoted by $R^2$ is a methyl group.

5. The curable organopolysiloxane composition as claimed in claim 1 wherein the component (B) is a resinous organohydrogenpolysiloxane composed of monofunctional siloxane units of the formula $(CH_3)_2HSiO_{0.5}$ and tetrafunctional siloxane units of the formula $SiO_2$.

6. The curable organopolysiloxane composition as claimed in claim 1 wherein the organopolysiloxane as the component (C) has a structure of cyclotetrasiloxane.

7. The curable organopolysiloxane composition as claimed in claim 1 wherein the oxirane group bonded to the silicon atom through a carbon atom is a glycidyl group.

* * * * *